(12) United States Patent
Furubayashi et al.

(10) Patent No.: US 10,244,569 B2
(45) Date of Patent: Mar. 26, 2019

(54) IMAGE FORMING SYSTEM, IMAGE FORMING APPARATUS, AND RECORDING MEDIUM

(71) Applicant: Konica Minolta, Inc., Chiyoda-ku, Tokyo (JP)

(72) Inventors: Toshiya Furubayashi, Takarazuka (JP); Akira Murakawa, Toyonaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 48 days.

(21) Appl. No.: 15/355,653

(22) Filed: Nov. 18, 2016

(65) Prior Publication Data

US 2017/0142767 A1 May 18, 2017

(30) Foreign Application Priority Data

Nov. 18, 2015 (JP) ................................. 2015-225550

(51) Int. Cl.
*H04W 76/14* (2018.01)
*H04W 76/11* (2018.01)
(Continued)

(52) U.S. Cl.
CPC ............ *H04W 76/14* (2018.02); *H04L 43/16* (2013.01); *H04W 4/80* (2018.02); *H04W 12/06* (2013.01); *H04W 76/11* (2018.02)

(58) Field of Classification Search
None
See application file for complete search history.

(56) References Cited

U.S. PATENT DOCUMENTS 9,703,946 B2 * 7/2017 Chandran ............. G06F 3/0416
9,924,297 B2 * 3/2018 Maldari ................... H04W 4/80
(Continued)

FOREIGN PATENT DOCUMENTS

CN 102457550 5/2012
JP 2006-148471 A 6/2006
(Continued)

OTHER PUBLICATIONS

Notification of Reasons for Refusal issued in corresponding Japanese Patent Application No. 2015-225550, dated Dec. 12, 2017, with English Translation (7 pages).
(Continued)

*Primary Examiner* — Diane L Lo
(74) *Attorney, Agent, or Firm* — Buchanan Ingersoll & Rooney PC

(57) ABSTRACT

A mobile terminal capable of communication with at least one image forming apparatus for transmitting waves for short-distance wireless communication includes a detection unit that detects, on the basis of the waves, a connection candidate device that is an image forming apparatus as a connection destination candidate in short-distance wireless communication, and a determination unit that determines a pairing mode of short-distance wireless communication in accordance with the number of connection candidate devices detected. When a single connection candidate device is detected as a connection candidate device, the determination unit determines, as the pairing mode, a first mode that does not involve an authentication operation in which a user of the mobile terminal authenticates a connection destination device for short-distance wireless communication, and when multiple connection candidate devices are detected as connection candidate devices, the determination unit determines a second mode that involves the authentication operation as the pairing mode.

18 Claims, 11 Drawing Sheets

(51) Int. Cl.
*H04W 4/80* (2018.01)
*H04L 12/26* (2006.01)
*H04W 12/06* (2009.01)

(56) References Cited

U.S. PATENT DOCUMENTS

| | | | |
|---|---|---|---|
| 9,949,124 B1* | 4/2018 | Chen | H04W 12/06 |
| 2011/0106954 A1* | 5/2011 | Chatterjee | G06F 1/1632 |
| | | | 709/227 |
| 2012/0075672 A1 | 3/2012 | Oishi | |
| 2012/0289159 A1* | 11/2012 | Palin | H04W 48/14 |
| | | | 455/41.2 |

FOREIGN PATENT DOCUMENTS

| | | |
|---|---|---|
| JP | 2007-67723 A | 3/2007 |
| JP | 2012-080333 | 4/2012 |
| JP | 2016-107612 | 6/2016 |

OTHER PUBLICATIONS

First Office Action issued in corresponding Chinese Patent Application No. 201611011269.5, dated Aug. 9, 2018, with English Translation (13 pages).

Search report issued in corresponding Chinese Patent Application No. 201611011269.5, dated Jul. 31, 2018, English language only (2 pages).

\* cited by examiner

IMAGE FORMING SYSTEM, IMAGE FORMING APPARATUS, AND RECORDING MEDIUM

This application is based on Japanese Patent Application No. 2015-225550 filed on Nov. 18, 2015, the contents of which are hereby incorporated by reference.

BACKGROUND OF INVENTION

Technical Field

The present invention relates to image forming systems that include image forming apparatuses such as Multi-Functional Peripherals (MFPs), and techniques related thereto.

Background Art

Communication between image forming apparatuses and mobile terminal devices may use various types of wireless communication technology. Examples include communication using wireless LANs (e.g., IEEE 802. 11) and/or short-distance wireless communication. One example of the short-distance wireless communication is communication based on the Bluetooth (registered trademark) standard.

Japanese Patent Application Laid-Open No. 2007-67723 describes a technique that is not related to an image forming apparatus, but that uses communication based on the Bluetooth standard for wireless communication between a mobile terminal and a peripheral device.

Pairing modes of the communication based on the Bluetooth standard (Bluetooth communication) include a mode that does not involve an operation (authentication operation) in which a user authenticates a connection destination device for Bluetooth communication, and a mode that involves the authentication operation.

One example of the mode that does not involve the authentication operation (also referred to as "no-authentication required mode") is "Just Works." In the "Just Works" mode, for example, a user does not perform the operation of authenticating a connection destination device for Bluetooth communication, and a device that is detected by a connection source device is automatically determined as a connection destination device and automatically paired with the connection source device.

Using the no-authentication required mode (e.g., "Just Works") saves users from performing the operation of authenticating a connection destination device (e.g., operation of authorizing the connection destination device) and does not reduce usability for users. However, in the case where multiple connectable apparatuses are in close proximity to one another, not involving the operation of a user authenticating a connection destination device may result in a situation where the connection source device is connected to a device other than the desired connection destination device for the user.

On the other hand, one example of the mode that involves the operation of a user authenticating a connection destination device (also referred to as "authentication required mode") is "Numeric Comparison." In the "Numeric Comparison" mode, for example, both a connection source device and a connection destination device display the same authentication code (authentication number) on their display units. Then, a pairing of the two devices is performed when the user has authenticated the device that displays the authentication code as the desired connection destination device and has performed an operation of approving of the desired connection destination device (approval operation), such as an operation of pressing an "OK" button, as the authentication operation.

In the case of using the authentication required mode (e.g., "Numeric Comparison"), the user is able to establish suitable and appropriate connection to his or her desired connection destination device through the operation of authenticating the connection destination device. However, using the authentication required mode requires the user to perform the operation of authenticating the connection destination device, thus increasing the trouble of the user (the trouble of performing the authentication operation) and reducing usability for the user.

In this way, usability for users is reduced when the authentication required mode is mainly used as the pairing mode of Bluetooth communication, and connection to a device other than the desired connection destination device for a user may be established when the no-authentication required mode is mainly used as the pairing mode.

SUMMARY OF INVENTION

It is an object of the present invention to provide a technique for use in short-distance wireless communication, which enables users to establish suitable and appropriate connection to desired connection destination devices while suppressing a reduction in usability for the users.

According to a first aspect of the present invention, an image forming system includes at least one image forming apparatus configured to transmit a wave for short-distance wireless communication, and a mobile terminal capable of communication with the at least one image forming apparatus. The mobile terminal includes a detection unit configured to detect a connection candidate device on the basis of the wave, the connection candidate device being an image forming apparatus that is a connection destination candidate in short-distance wireless communication, and a determination unit configured to determine a pairing mode of the short-distance wireless communication in accordance with the number of connection candidate devices detected by the detection unit. The determination unit is configured to, in a case where a single connection candidate device is detected as the connection candidate device, determine a first mode as the pairing mode, the first mode being a mode that does not involve an authentication operation in which a user of the mobile terminal authenticates a connection destination device for the short-distance wireless communication, and in a case where a plurality of connection candidate devices are each detected as the connection candidate device, determine a second mode that involves the authentication operation as the pairing mode.

According to a second aspect of the present invention, a non-transitory computer-readable recording medium that records a program for causing a computer that is built into a mobile terminal capable of communication with at least one image forming apparatus for transmitting a wave for short-distance wireless communication, to execute the steps of a) detecting a connection candidate device on the basis of the wave, the connection candidate device being an image forming apparatus that is a connection destination candidate in short-distance wireless communication, and b) determining a pairing mode of the short-distance wireless communication in accordance with the number of connection candidate devices detected in the step a). In the step b), in a case where a single connection candidate device is detected as the connection candidate device, a first mode that does not involve an authentication operation in which a user of the mobile terminal authenticates a connection destination device for the short-distance wireless communication is determined as the pairing mode, and in a case where a plurality of connection candidate devices are each detected as the connection candidate device, a second mode that involves the authentication operation is determined as the pairing mode.

According to a third aspect of the present invention, an image forming apparatus for transmitting a wave for short-distance wireless communication and being capable of communication with a mobile terminal, the apparatus includes a receiving unit configured to receive a mode designation notification from the mobile terminal, the mode designation notification designating either a first mode or a second mode as a pairing mode of short-distance wireless communication, the first mode being a mode that does not involve an authentication operation in which a user of the mobile terminal authenticates a connection destination device for the short-distance wireless communication, and the second mode being a mode that involves the authentication operation, and a pairing unit configured to perform a pairing with the mobile terminal in the short-distance wireless communication, using the pairing mode designated by the mode designation notification.

According to a fourth aspect of the present invention, a mobile terminal capable of communication with at least one image forming apparatus for transmitting a wave for short-distance wireless communication, includes a detection unit configured to detect a connection candidate device on the basis of the wave, the connection candidate device being an image forming apparatus that is a connection destination candidate in short-distance wireless communication, and a determination unit configured to determine a pairing mode of the short-distance wireless communication in accordance with the number of connection candidate devices detected by the detection unit. The determination unit is configured to, in a case where a single connection candidate device is detected as the connection candidate device, determine a first mode as the pairing mode, the first mode being a mode that does not involve an authentication operation in which a user of the mobile terminal authenticates a connection destination device for the short-distance wireless communication, and in a case where a plurality of connection candidate devices are each detected as the connection candidate device, determine a second mode that involves the authentication operation as the pairing mode.

According to a fifth aspect of the present invention, a non-transitory computer-readable recording medium that records a program for causing a computer that is built into an image forming apparatus for transmitting a wave for short-distance wireless communication and being capable of communication with a mobile terminal, to execute the steps of a) receiving a mode designation notification from the mobile terminal, the mode designation notification designating either a first mode or a second mode as a pairing mode of short-distance wireless communication, the first mode being a mode that does not involve an authentication operation in which a user of the mobile terminal authenticates a connection destination device for the short-distance wireless communication, and the second mode being a mode that involves the authentication operation, and b) performing a pairing with the mobile terminal in the short-distance wireless communication, using the pairing mode designated by the mode designation notification.

These and other objects, features, aspects and advantages of the present invention will become more apparent from the following detailed description of the present invention when taken in conjunction with the accompanying drawings.

DETAILED DESCRIPTION OF PREFERRED EMBODIMENTS

Hereinafter, embodiments of the present invention will be described with reference to the drawings.

1. Overview of Configuration

Figure 1:
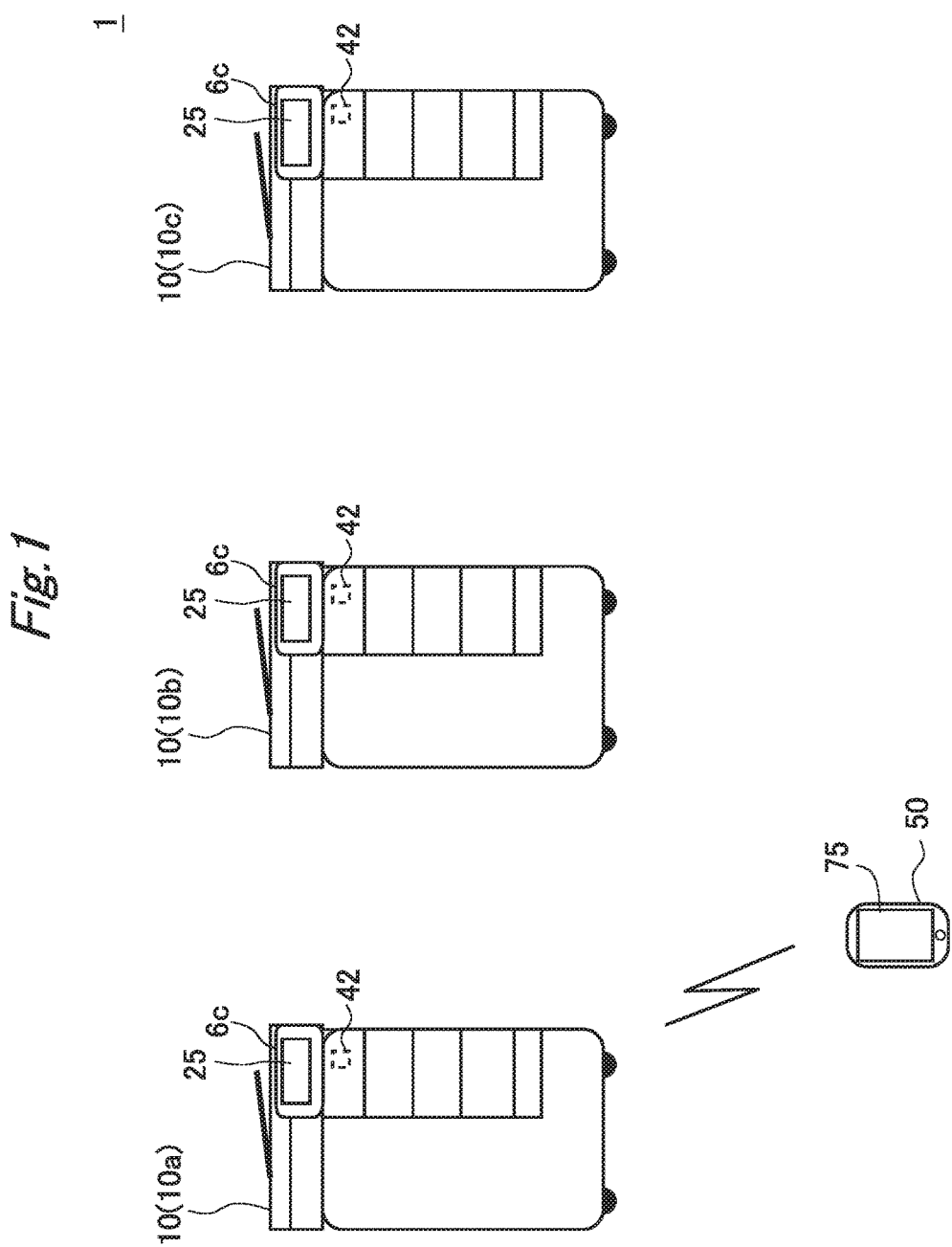
FIG. 1 illustrates an image forming system.

FIG. 1 illustrates an image forming system (communication system) 1 according to the present invention. As illustrated in FIG. 1, the image forming system 1 includes multiple image forming apparatuses 10 (10a, 10b, and 10c) and a mobile terminal 50.

The image forming apparatus 10 and the mobile terminal 50 are wirelessly connected to each other by various types of wireless communication technology. For example, communication between the image forming apparatuses 10 and the mobile terminal 50 may use communication using wireless LANs (e.g., IEEE 802.11) and short-distance wireless communication. The image forming system 1 uses communication based on the Bluetooth (registered trademark) standard (Bluetooth communication) for short-distance wireless communication. Note that Bluetooth communication includes, for example, Bluetooth Low Energy (BLE), which is an extended standard for Bluetooth.

Pairing modes (connection modes) of Bluetooth communication include two modes, namely, a "no-authentication required mode" and an "authentication required mode." Note that in the image forming system 1, the mobile terminal 50 is assumed to be a connection source device in Bluetooth communication, and the image forming apparatuses 10 are assumed to be connection destination devices in Bluetooth communication.

The "no-authentication required mode" is a mode that does not involve the operation of a user authenticating a connection destination device (operation in which a user of the connection source device (mobile terminal 50) authenticates a connection destination device for Bluetooth communication). One example of the no-authentication required mode is "Just Works." In the "Just Work" mode, for example, the user is not required to perform the authentication operation (operation of authenticating a connection destination device), and one of the image forming apparatuses 10 that is detected by the connection source device (mobile terminal 50) is automatically determined as the connection destination device and automatically paired with the connection source device.

On the other hand, the "authentication required mode" is a mode that involves the authentication operation of a user of the connection source device (mobile terminal 50) authenticating a connection destination device. Examples of the authentication required mode include "Numeric Comparison" and "Passkey Entry."

In the "Numeric Comparison" mode, for example, the same authentication code (authentication number) is displayed on both a touch panel 75 (FIG. 1) of the connection source device (mobile terminal 50) and a touch panel 25 (FIG. 1) of the apparatus (selected device) selected as the connection destination device. Then, a pairing of the two devices is performed when the user of the mobile terminal 50 has authenticated the image forming apparatus 10 that displays the authentication code as the desired connection destination device and performed an operation such as pressing an OK button as the operation of approving the image forming apparatus 10 as the desired connection destination device.

In the "Passkey Entry" mode, for example, a user is required to authenticate the connection destination device and then input the authentication code displayed on the connection destination device via an input unit of the connection source device (mobile terminal 50). Then, a pairing of the two devices is performed when the user has authenticated the image forming apparatus 10 that displays the authentication code as the desired connection destination device and has performed the operation of inputting the authentication code as the authentication operation.

In the present example, the "Just Works" mode is used as an example of the no-authentication required mode, and the "Numeric Comparison" mode is used as an example of the authentication required mode.

2. Configuration of Image Forming Apparatus

Figure 2:
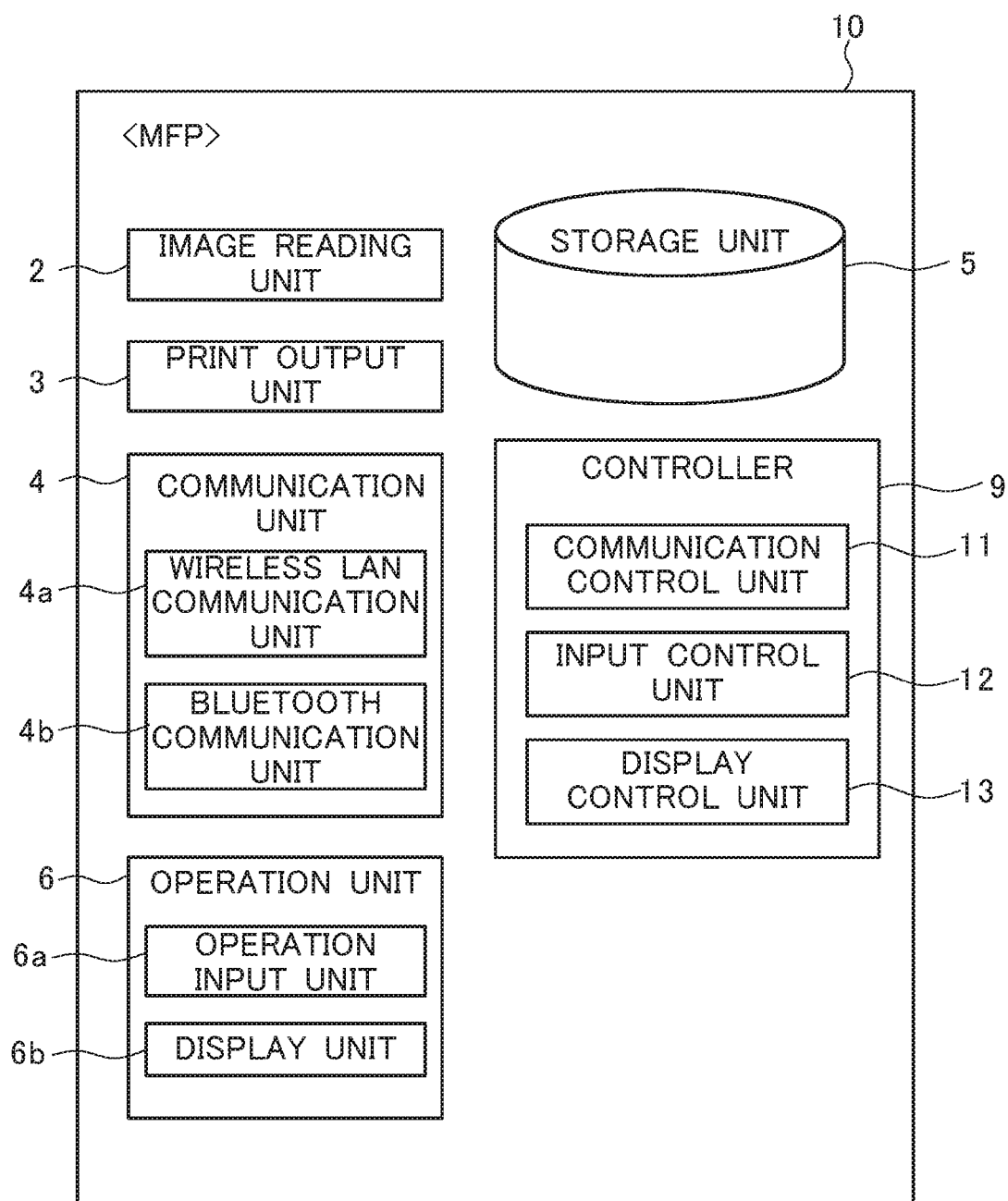
FIG. 2 illustrates functional blocks of an image forming apparatus (MFP).

FIG. 2 illustrates functional blocks of an image forming apparatus 10 (10a to 10c). Here, a Multi-Functional Peripheral (MFP) is taken as an example of the image forming apparatus 10. The functional blocks of the MFP 10 are illustrated in FIG. 2.

The MFP 10 is an apparatus (also, referred to as a "Multi-Functional Peripheral") that have functions such as a scan function, a copy function, a facsimile function, and a box storage function. More specifically, the MFP 10 includes, for example, an image reading unit 2, a print output unit 3, a communication unit 4, a storage unit 5, an operation unit 6, and a controller 9 as illustrated in the functional block diagram of FIG. 2, and implements various types of functions by operating these units in combination.

The image reading unit 2 is a processing unit that optically reads (i.e., scans) an original document placed at a predetermined position on the MFP 10 and generates image data of the original document (also referred to as an "original image" or a "scanned image"). The image reading unit 2 is also referred to as a "scanning unit."

The print output unit 3 is an output unit that prints out an image on various types of media such as paper on the basis of data regarding an object to be printed.

The communication unit 4 is a processing unit capable of facsimile communication via, for example, a public network. The communication unit 4 is also capable of various types of wireless communication (including Bluetooth communication). More specifically, the communication unit 4 includes a wireless LAN communication unit 4a that performs wireless communication using wireless LANs (e.g., IEEE 802.11), and a Bluetooth communication unit 4b that performs Bluetooth communication (wireless communication based on the Bluetooth standard). The MFP 10 includes a built-in Bluetooth chip 42 (also referred to as a "short-distance wireless communication chip" or simply "communication chip") that functions as a part or the entire of the Bluetooth communication unit 4b (see also FIG. 1). The Bluetooth chip 42 is capable of broadcasting advertising data (broadcast transmission data). The advertising data includes (describes) device identification information of the MFP 10 (e.g., media access control (MAC) address and device ID).

The storage unit 5 is configured by a storage device such as a hard disk drive (HDD).

The operation unit 6 includes an operation input unit 6a that accepts operation input to the MFP 10, and a display unit 6b that displays and outputs various types of information.

The MFP 10 is also provided with a generally plate-like operation panel unit 6c (see FIG. 1). The operation panel unit 6c includes the touch panel 25 (see FIG. 1) on the front side. The touch panel 25 not only functions as part of the operation input unit 6a but also functions as part of the display unit 6b. The touch panel 25 is configured by embedding, for example, various types of sensors in a liquid crystal display panel, and is capable of displaying various types of information as well as accepting various types of operation input from an operator.

The controller 9 is a control device that is built into the MFP 10 and performs overall control of the MFP 10. The controller 9 is configured as a computer system that includes, for example, a CPU and various types of semiconductor memories (RAM and ROM). The controller 9 implements various types of processing units by causing the CPU to execute predetermined software programs (hereinafter, also simply referred to as "programs") stored in the ROM (e.g., EEPROM (registered trademark)). Note that those programs (specifically, a group of program modules) may be recorded in a portable recording medium (or in other words, any of various types of non-transitory computer-readable recording media) such as a USB memory, read from the recording medium, and installed into the MFP 10. Alternatively, the programs may be downloaded via the network and installed into the MFP 10.

More specifically, as illustrated in FIG. 2, the controller 9 implements various types of processing units that include a communication control unit 11, an input control unit 12, and a display control unit 13, by executing the programs.

The communication control unit 11 is a processing unit that controls operations of communication with other devices (e.g., mobile terminal 50) in cooperation with, for example, the communication unit 4. The communication control unit 11 includes a transmission control unit that controls operations of transmitting various types of data, and a reception control unit that controls operations of receiving various types of data. The communication control unit 11 also controls, for example, operations of pairing with the connection source device in cooperation with the communication unit 4 (Bluetooth communication unit 4b). More specifically, the communication control unit 11 uses a pairing mode that is designated by a mode designation notification received from the mobile terminal 50 (notification that designates either the no-authentication required mode or the authentication required mode as a pairing mode of Bluetooth communication) to perform a pairing with the mobile terminal 50. The communication control unit 11 is also referred to as a "pairing unit."

The input control unit 12 is a control unit that controls operations of inputting operations to the operation input unit 6a (e.g., touch panel 25). For example, the input control unit 12 controls operations of accepting operation input to the operation screen displayed on the touch panel 25.

The display control unit 13 is a processing unit that controls display operations of the display unit 6b (e.g., touch panel 25). The display control unit 13 causes the touch panel 25 to display screens such as an operation screen for operating the MFP 10.

3. Configuration of Mobile Terminal

Next is a description of the configuration of the mobile terminal 50.

The mobile terminal (external terminal) 50 is an information input/output terminal device (information terminal) capable of network communication with the MFPs 10. In the present example, a smartphone is illustrated as an example of the mobile terminal 50. The present invention is, however, not limited to this example, and the mobile terminal 50 may be other devices such as a tablet terminal.

Figure 3:
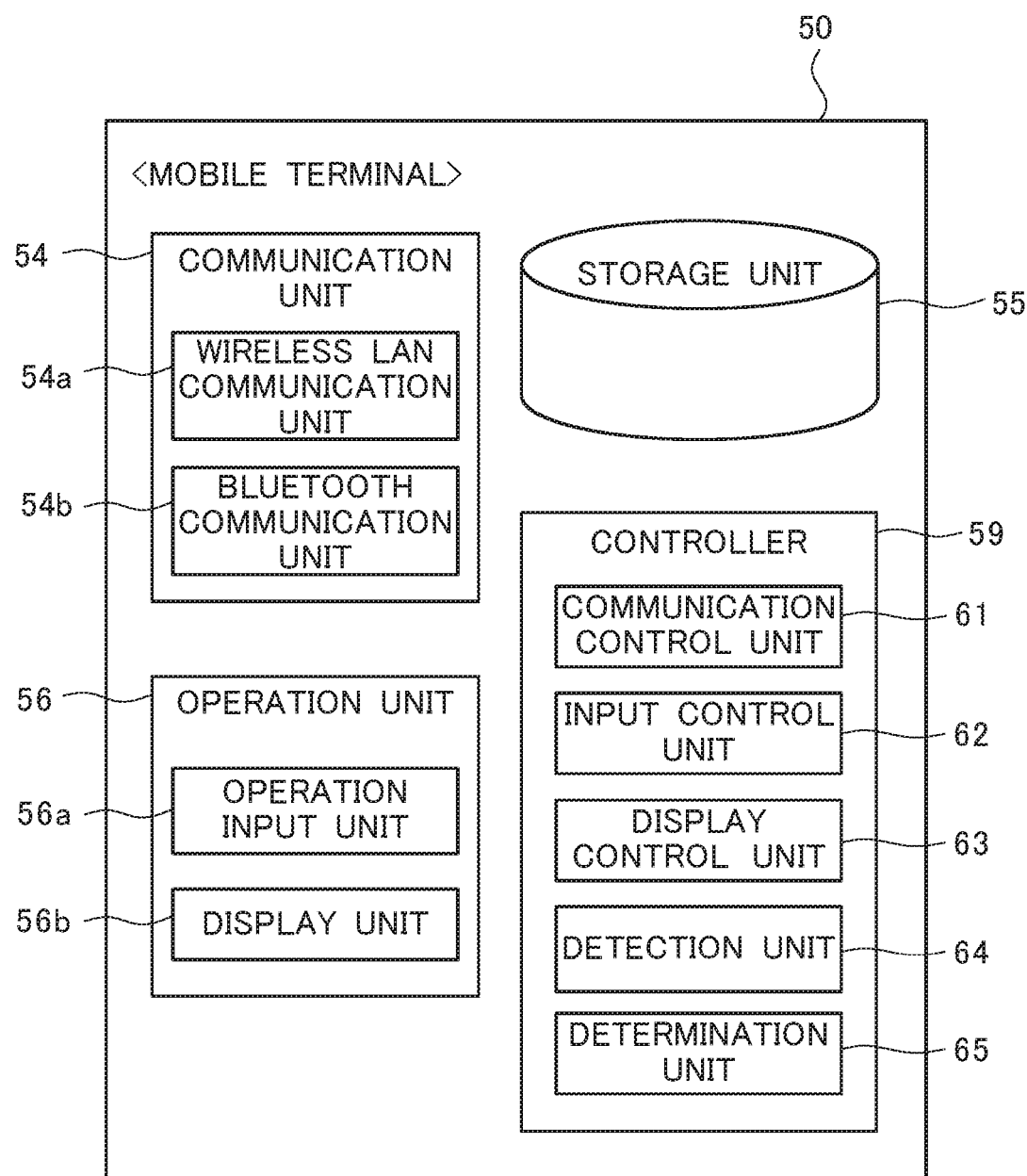
FIG. 3 is a functional block diagram illustrating a schematic configuration of a mobile terminal.

FIG. 3 is a functional block diagram illustrating a schematic configuration of the mobile terminal 50.

As illustrated in the functional block diagram of FIG. 3, the mobile terminal 50 includes, for example, a communication unit 54, a storage unit 55, an operation unit 56, and a controller 59 and implements various types of functions by operating these units in combination.

The communication unit 54 is capable of various types of wireless communication (including Bluetooth communication). More specifically, the communication unit 54 includes a wireless LAN communication unit 54a that performs wireless communication using wireless LANs (e.g., IEEE 802.11), and a Bluetooth communication unit 54b that performs Bluetooth communication (wireless communication based on the Bluetooth standard). The Bluetooth communication unit 54b receives the advertising data that is broadcast from the Bluetooth chip 42 built into the MFP 10, and measures the intensity of waves (radio waves) for the data transmission.

The storage unit 55 is configured by a storage device such as a nonvolatile semiconductor memory. The storage unit 55 stores various types of screens (see, for example, FIG. 6), which will be described later (to be more specific, display data of the screens).

The operation unit 56 includes an operation input unit 56a that accepts operation input to the mobile terminal 50, and a display unit 56b that displays and outputs various types of information. The mobile terminal 50 is provided with the touch panel 75 (see FIG. 1) that is configured by, for example, embedding various types of sensors in a liquid crystal display panel. The touch panel 75 not only functions as part of the operation input unit 56a but also functions as part of the display unit 56b.

The controller 59 in FIG. 3 is a control device that is built into the mobile terminal 50 and performs overall control of the mobile terminal 50. The controller 59 is configured as a computer system that includes, for example, a CPU and various types of semiconductor memories (e.g., RAM and ROM). The controller 59 implements various types of processing units by causing the CPU to execute predetermined software programs (hereinafter, also simply referred to as "programs") stored in the storage unit (e.g., semiconductor memory). Note that the programs (specifically, a group of program modules) may be recorded in a portable recording medium (or in other words, any of various types of non-transitory computer-readable recording media) such as a USB memory, read from the recording medium, and installed into the mobile terminal 50. Alternatively, the programs may be downloaded via a network and installed into the mobile terminal 50.

More specifically, the controller 59 implements various types of processing units that include a communication control unit 61, an input control unit 62, a display control unit 63, a detection unit 64, and a determination unit 65, by executing the programs.

The communication control unit 61 is a processing unit that controls operations of communication with, for example, the MFPs 10 in cooperation with, for example, the communication unit 54. The communication control unit 61 is also a processing unit that controls operations such as pairing with the connection destination device.

The input control unit 62 is a control unit that controls operations such as inputting operation to the operation input unit 56a (e.g., touch panel 75).

The display control unit 63 is a processing unit that controls operations of displaying various types of information on the display unit 56b (e.g., touch panel 75). The display control unit 63 controls, for example, operations of displaying a device list screen 510.

The detection unit (detection processing unit) 64 is a processing unit that controls operations such as detecting an MFP 10 (connection candidate device) that is a connection destination candidate in Bluetooth communication, on the basis of waves for Bluetooth communication.

The determination unit (determination processing unit) 65 is a processing unit that controls operations of determining a pairing mode of Bluetooth communication. More specifically, the determination unit 65 determines the pairing mode in accordance with the number of connection candidate devices detected by the detection unit 64. To be more specific, when a single connection candidate device is detected as a connection candidate device, the determination unit 65 determines a mode (no-authentication required mode; in the present example, "Just Works") that does not involve the authentication operation (operation in which the user of the mobile terminal 50 authenticates a connection destination device for Bluetooth communication) as a pairing mode. On the other hand, when multiple connection candidate devices are detected as connection candidate devices, the determination unit 65 determines a mode (authentication required mode; in the present example, "Numeric Comparison") that involves the authentication operation as a pairing mode.

4. Operations

Proximity Determination Processing

Before describing processing such as determining a pairing mode, proximity determination processing that the mobile terminal 50 performs on the MFPs 10 will be described.

An MFP 10 constantly transmits waves (radio waves) for Bluetooth communication (waves that reach peripheral areas of the MFP 10 (e.g., within several tens meters)) at a very short time interval. To be more specific, the Bluetooth chips 42 (see FIG. 1) built into the MFP 10 broadcast the advertising data. This operation is performed by each of the MFPs 10 (MFPs 10a, 10b, and 10c).

On the other hand, the mobile terminal 50 receives the waves for Bluetooth communication from each of the MFPs 10 (MFPs 10a to 10c) and measures the intensity of the waves. More specifically, the mobile terminal 50 (the communication control unit 61 and the detection unit 64) receives the advertising data that is broadcast from the Bluetooth chips 42 of each MFP 10 in cooperation with the Bluetooth communication unit 54b of the mobile terminal 50, and measures the intensity of the waves for data transmission.

For example, when the distance between the mobile terminal 50 and a certain MFP 10 (e.g., MFP 10a) is relatively short, the intensity of the waves detected (measured) by the mobile terminal 50 (intensity of the waves transmitted from the Bluetooth chip 42 of the MFP 10a) is relatively high. On the contrary, when the distance between the mobile terminal 50 and the MFP 10a is relatively long, the intensity of the waves detected (measured) by the mobile terminal 50 (intensity of the waves from the MFP 10a) is relatively low.

Using this property, the mobile terminal 50 (detection unit 64) determines whether the mobile terminal 50 is in close proximity to the MFP 10, depending on whether the intensity of the acquired waves is higher than a predetermined threshold value TH. More specifically, it is determined whether the distance between the mobile terminal 50 and an MFP 10 (to be more specific, the location of the Bluetooth chip 42 within the MFP 10) is within a predetermined range (e.g., three meters). Note that the threshold value TH may be a measured value that is obtained by measuring in advance the intensity of waves acquired when the distance between the mobile terminal 50 and the MFP 10 becomes close to a predetermined distance (e.g., three meters).

In this way, the mobile terminal 50 uses the intensity of waves acquired from an MFP 10 to determine whether the mobile terminal 50 is in close proximity to the MFP 10 (whether the MFP 10 is located within a predetermined range from the mobile terminal 50).

Processing for Determining Pairing Mode

Figure 4:
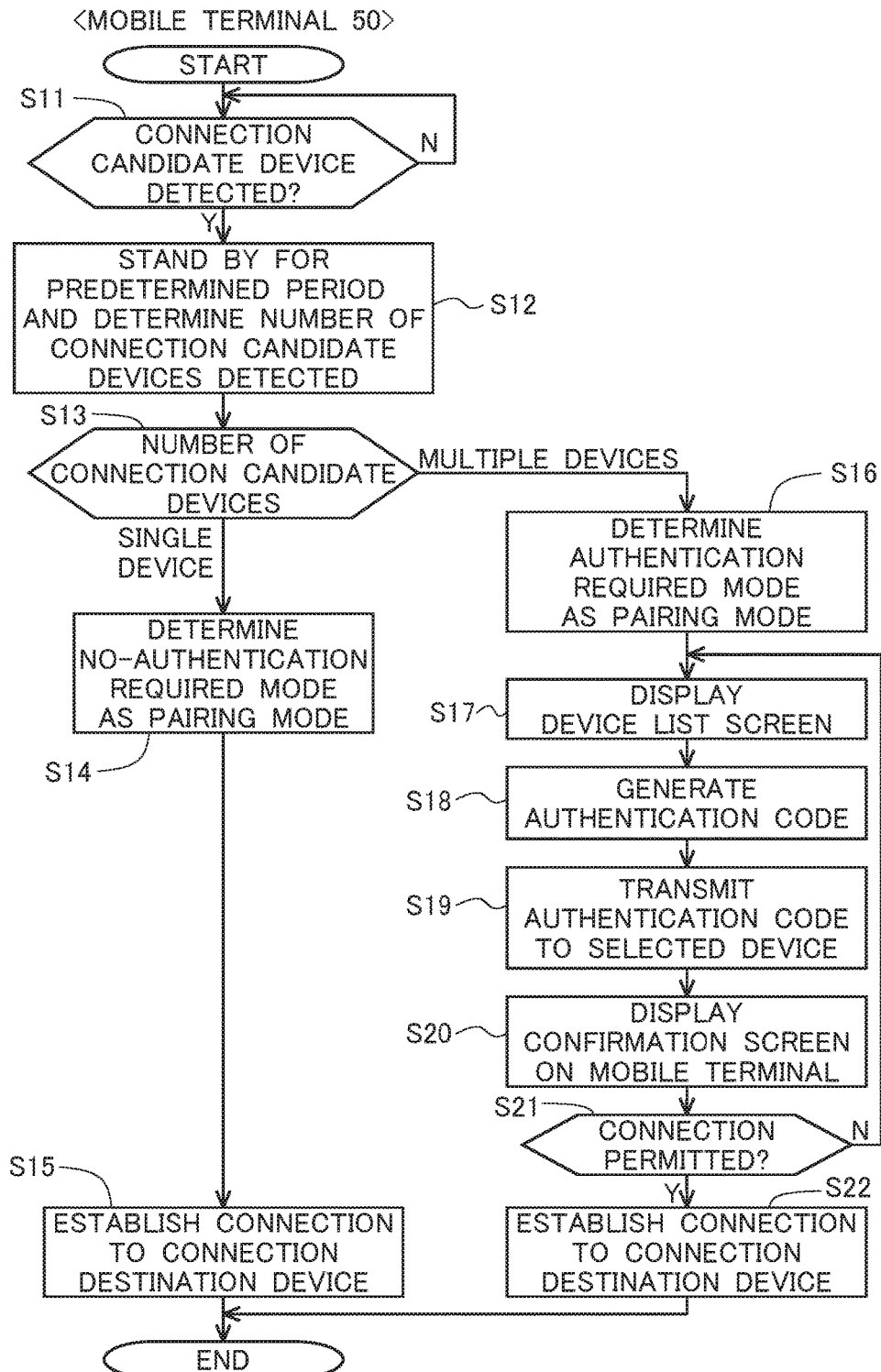
FIG. 4 is a flowchart of operations performed by the mobile terminal.
Figure 11:
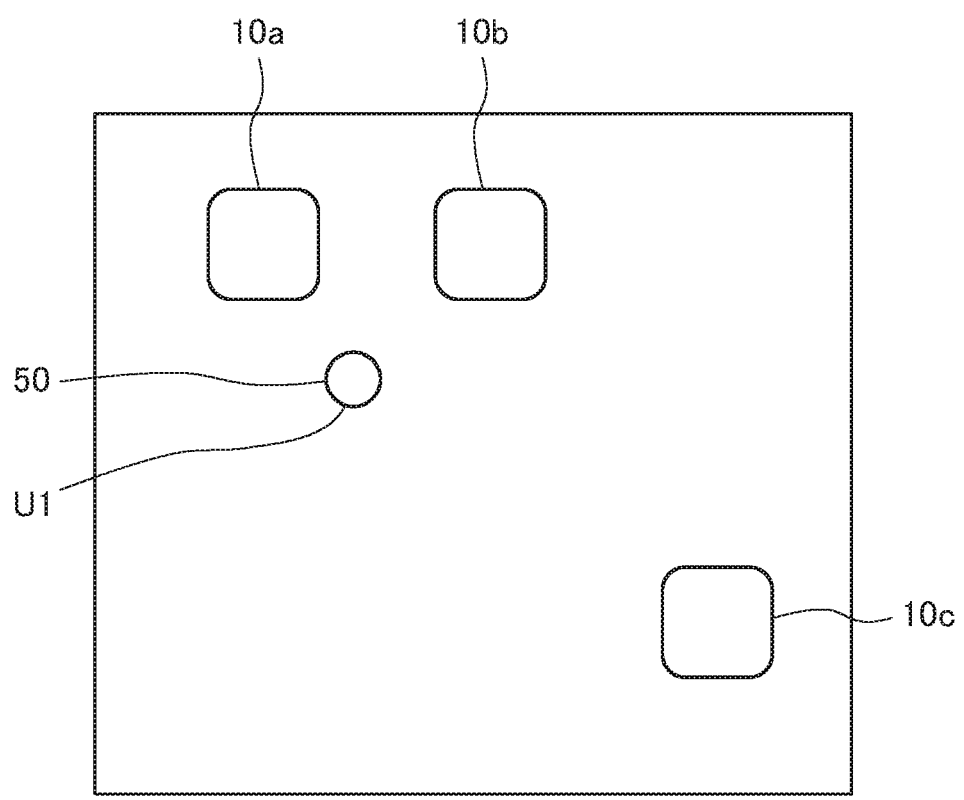
FIG. 11 illustrates an example of arrangement of MFPs.

FIG. 4 is a flowchart of operations performed by the mobile terminal 50. Hereinafter, processing such as determining a pairing mode (connection mode) for use in Bluetooth communication will be described with reference to FIG. 4 and other drawings. Here, a situation is assumed in which a user (e.g., user U1) of the mobile terminal 50 is in the vicinity of both the MFP 10a and the MFP 10b among the MFPs 10a to 10c as illustrated in FIG. 11. It is also assumed here that the MFP 10b transmits unstable waves for Bluetooth communication.

In step S11, the mobile terminal 50 (detection unit 64) determines whether an MFP 10 (connection candidate device) that is a connection destination candidate in Bluetooth communication has been detected.

More specifically, the mobile terminal 50 (detection unit 64) detects a connection candidate device on the basis of the waves for Bluetooth communication acquired by the mobile terminal 50. To be more specific, the mobile terminal 50 detects a connection candidate device for Bluetooth communication on condition that the waves acquired by the mobile terminal 50 has intensity higher than a predetermined threshold value TH. In other words, the mobile terminal 50 detects MFPs 10 that are located within a predetermined range (proximity range) from the mobile terminal 50 as connection candidate devices.

In the present example, it is determined that the intensity of the waves from the MFP 10a is higher than the threshold value TH, and the MFP 10a is (first) detected as a connection candidate device (step S11).

In step S12, the mobile terminal 50 (determination unit 65) stands by for a predetermined period of time (e.g., three seconds) from when one MFP 10 (here, the MFP 10a) has been detected as a connection candidate device, and then determines the (final) number of connection candidate devices detected.

If a certain MFP 10 (e.g., MFP 10b) transmits unstable waves, the intensity of the waves from the MFP 10b may be lower than or equal to the threshold value TH, irrespective of the proximity of the MFP 10b to the mobile terminal 50, at the time when the MFP 10a is as a connection candidate device. In other words, the MFP 10b located in close proximity to the mobile terminal 50 may not be detected as a connection candidate device when the MFP 10a is detected as a connection candidate device.

In order to detect such an MFP 10 (here, MFP 10b) as a connection candidate device, the mobile terminal 50 continues to acquire waves for Bluetooth communication for a predetermined period of time after the MFP 10a has been detected as a connection candidate device and then, after the elapse of the predetermined period of time, determines the (final) number of connection candidate devices detected (step S12).

The mobile terminal 50 (determination unit 65) then checks the (final) number of connection candidate devices detected (step S13), and determines a pairing mode of Bluetooth communication in accordance with the number of devices detected (steps S14 and S16).

For example, when no MFPs 10 are detected as connection candidate devices within a predetermined period of time from when one MFP 10 (here, MFP 10a) has (first) been detected as a connection candidate device in step S11, the mobile terminal 50 determines in step S12 that the (final) number of connection candidate devices detected is one (i.e., only the MFP 10a is a connection candidate device).

Then, it is determined in step S13 that a single connection candidate device (here, only the MFP 10a) is detected as a connection candidate device, and the procedure proceeds to step S14.

In step S14, the mobile terminal 50 (determination unit 65) determines a no-authentication required mode (here, "Just Works") as a pairing mode. In addition, the MFP 10a is (automatically) determined as a connection destination device in Bluetooth communication with the mobile terminal 50.

When the connection destination device has been determined, the mobile terminal 50 transmits a notification (mode designation notification) that designates the no-authentication required mode as a pairing mode of Bluetooth communication between the mobile terminal 50 and the connection destination device (MFP 10a), to the MFP 10a that is determined as the connection destination device. In the MFP 10a, the pairing mode of Bluetooth communication with the mobile terminal 50 is determined to be the mode (no-authentication required mode ("Just Works")) designated by the mode designation notification received from the mobile terminal 50.

In step S15, the mobile terminal 50 (communication control unit 61) performs a pairing with the connection destination device (MFP 10a) in the "Just Works" mode and establishes connection to the connection destination device (MFP 10a). To be more specific, the mobile terminal 50 (communication control unit 61) performs a pairing with the MFP 10a, using the pairing mode ("Just Works") determined by the mobile terminal 50, whereas the MFP 10a performs a pairing with the mobile terminal 50, using the pairing mode ("Just Works") designated by the mode designation notification received from the mobile terminal 50.

In this way, when only a single connection candidate device (here, only the MFP 10a) is detected as a connection candidate device, a no-authentication required mode is determined as a pairing mode, and a user is not required to perform the operation of authenticating whether the MFP 10

(MFP 10*a*) detected as the connection candidate device is the desired connection destination device for the user. Then, the pairing of the mobile terminal 50 and the connection destination device (MFP 10*a*) is automatically performed to establish connection between the two devices.

When the connection between the mobile terminal 50 and the MFP 10*a* has been established, a job such as a print job is transmitted from the mobile terminal 50 and the connection destination device (MFP 10*a*) and executed by the MFP 10*a*.

On the other hand, when another MFP 10 is detected as a connection candidate device within a predetermined period of time from when one MFP 10 (here, the MFP 10*a*) has (first) been detected as a connection candidate device in step S11, the mobile terminal 50 determines in step S12 that the (final) number of connection candidate devices detected is plural.

More specifically, for example when the waves from the MFP 10*b* has intensity that exceeds the threshold value TH within a predetermined period of time from when one MFP 10 (here, MFP 10*a*) has been detected as a connection candidate device, the mobile terminal 50 also detects the MFP 10*b* as a connection candidate device. Here, the MFPs 10 detected as connection candidate devices within a predetermined period of time are the MFPs 10*a* and 10*b*, and the mobile terminal 50 determines that the (final) number of connection candidate devices detected is two (step S12).

Note that even if the intensity of the waves from any of the MFPs 10 (MFP 10*a* or MFP 10*b*) that has once been detected as a connection candidate device because of the intensity of the waves exceeding the threshold value TH falls below the threshold value TH within the predetermined period of time, the mobile terminal 50 still determines this MFP 10 as a connection candidate device. That is, the mobile terminal 50 determines that the number of connection candidate devices detected is a total number of MFPs 10 that are at least once detected as connection candidate devices within a predetermined period of time from when one MFP 10 has been detected as a connection candidate device.

In step S13, it is determined that multiple connection candidate devices (here, MFPs 10*a* and 10*b*) have been detected as connection candidate devices, and the procedure proceeds to step S16.

In step S16, the mobile terminal 50 (determination unit 65) determines an authentication required mode (here, "Numeric Comparison") as a pairing mode.

When the authentication required mode ("Numeric Comparison") has been determined as a pairing mode, the mobile terminal 50 displays a device list screen 510 (see FIG. 5) (step S17) and performs processing for authenticating a connection destination device in the authentication required mode ("Numeric Comparison") (steps S18 to S21).

Figure 5:
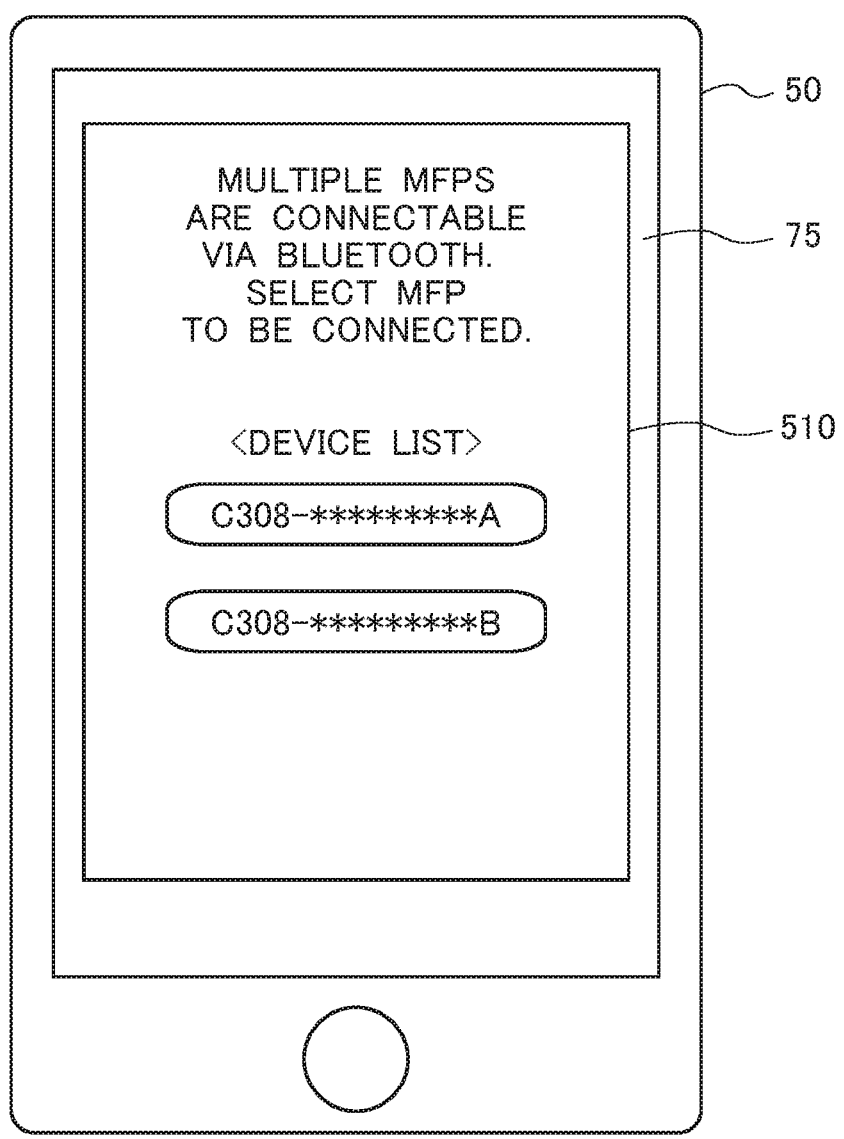
FIG. 5 illustrates a device list screen.

More specifically, the mobile terminal 50 (display control unit 63) first displays the device list screen 510 (see FIG. 5) on the touch panel 75 of the mobile terminal 50 (step S17). As illustrated in FIG. 5, the device list screen 510 displays not only the device list that contains multiple connection candidate devices (here, MFPs 10*a* and 10*b*), but also a message to request selection, such as "Multiple MFPs are connectable via Bluetooth. Select the MFP to be connected."

As illustrated in FIG. 5, the device list separately displays device identification information (here, device ID) of the multiple connection candidate devices (here, MFPs 10*a* and 10*b*).

More specifically, the device identification information (device ID) of each MFP 10 is acquired from the advertising data when the waves for Bluetooth communication is received from the MFP 10, and the device ID of the MFP 10 is temporarily stored in the mobile terminal 50. Then, the device IDs of MFPs 10 detected as connection candidate devices (MFPs 10 that satisfy the condition that the waves have intensity higher than the predetermined threshold value TH) are listed in the device list. In the present example, the device list contains the device ID ("C308-******A") of the MFP 10***a* and the device ID ("C308-*******B") of the MFP 10***b* as illustrated in FIG. 5.

In the device list, the multiple connection candidate devices (MFPs 10*a* and 10*b*) (to be more specific, the device IDs of the multiple connection candidate devices) are displayed in descending order of the intensity (in order of descending intensity) of the waves acquired from the multiple connection candidate devices. In other words, the device list displays the multiple connection candidate devices (the device IDs of the multiple connection candidate devices) in ascending order of the distance (in order of proximity) to the mobile terminal 50.

More specifically, the mobile terminal 50 (detection unit 64) obtains the distance between the mobile terminal 50 and each of the multiple connection candidate devices (MFPs 10*a* and 10*b*) on the basis of the intensity of the waves from the connection candidate device. To be more specific, the detection unit 64 obtains an estimated distance (e.g., about two meters) between the mobile terminal 50 and the MFP 10*a* on the basis of the intensity of the waves from the MFP 10*a*, and also obtains an estimated distance (e.g., about three meters) between the mobile terminal 50 and the MFP 10*b* on the basis of the intensity of the waves from the MFP 10*b*. Then, the mobile terminal 50 (display control unit 63) displays the connection candidate devices (to be more specific, device IDs) in order of proximity to the mobile terminal 50 (here, in the order of the MFP 10*a* and the MFP 10*b*) in the device list (see FIG. 5).

The user of the mobile terminal 50 selects (presses) a desired connection candidate device from among the multiple connection candidate devices listed in the device list as a connection destination device for Bluetooth communication. In the present example, the MFP 10*a* is selected as a connection destination device.

When one connection candidate device has been selected as a connection destination device from among the multiple connection candidate devices, the mobile terminal 50 (communication control unit 61) tentatively determines the selected device (here, the MFP 10*a*) as a connection destination device.

When the connection destination device has been tentatively determined, the mobile terminal 50 transmits a mode designation notification that designates an authentication required mode (here, "Numeric Comparison") as a pairing mode, to the connection destination device (MFP 10*a*). In the MFP 10*a*, the mode (authentication required mode or "Numeric Comparison") designated by the mode designation notification from the mobile terminal 50 is determined as a pairing mode of Bluetooth communication with the mobile terminal 50, and a pairing with the mobile terminal 50 is performed in the designated mode as will be described later.

In steps S18 to S21, processing for authenticating the connection destination device is performed in the "Numeric Comparison" mode.

First, in step S18, the mobile terminal 50 (communication control unit 61) generates an authentication code (authentication number) of predetermined digits, using random numbers. In the present example, a 6-digit authentication code (e.g., "135846") is generated.

In step S19, the mobile terminal 50 (communication control unit 61) transmits the authentication code (here, "135846") to the selected device (here, MFP 10a).

Figure 7:
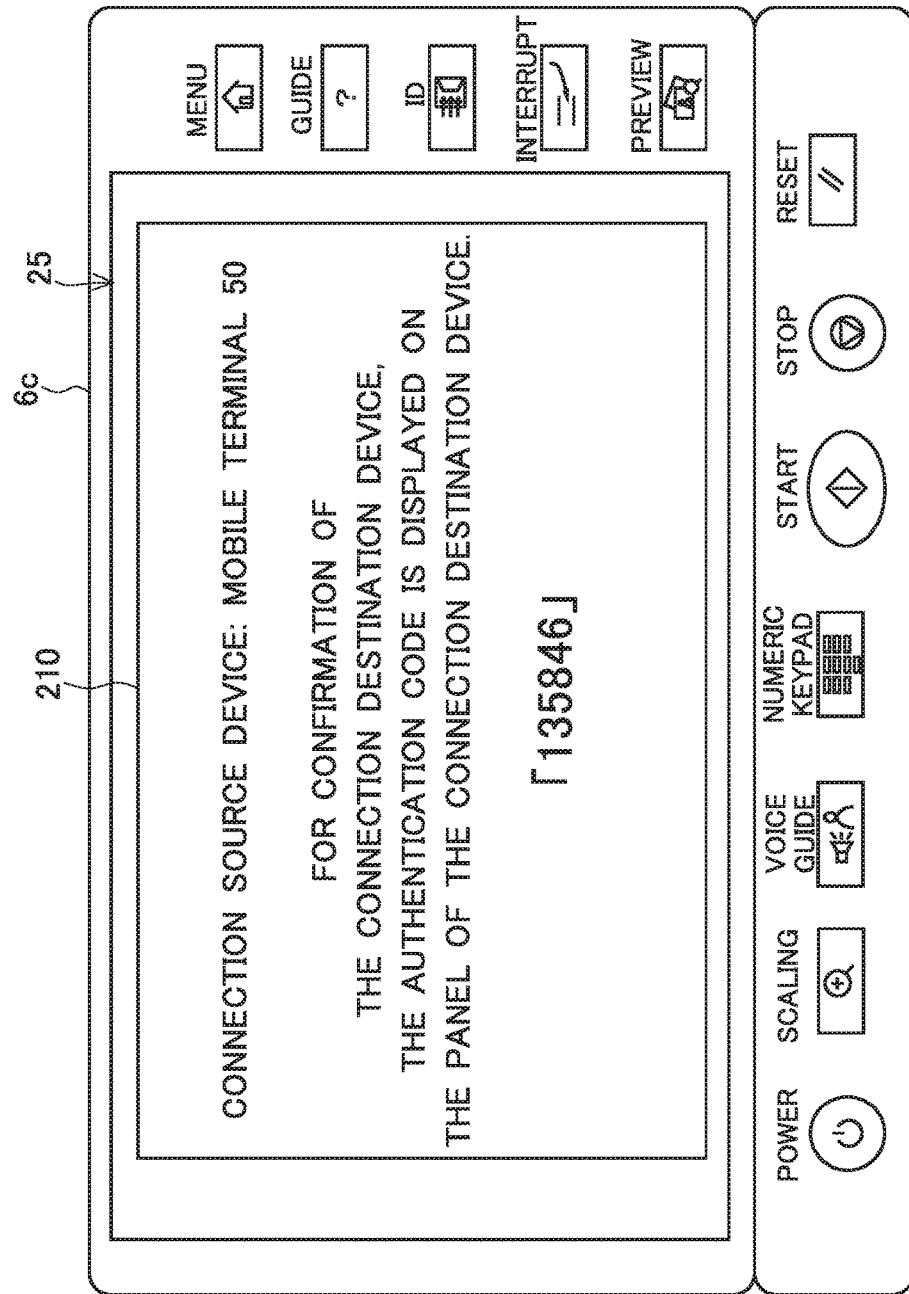
FIG. 7 illustrates a confirmation screen on the MFP.

When the authentication code is received from the mobile terminal 50, the display control unit 13 of the selected device (MFP 10a) displays a confirmation screen 210 that includes the authentication code ("135846") on the touch panel 25 (see FIG. 7). In the present example, when the authentication code is received from the mobile terminal 50, the confirmation screen 210 is (always) displayed on the touch panel 25 of the MFP 10a, irrespective of whether the selected device (MFP 10a) is currently being used by other users, which will be described later.

The confirmation screen 210 is a screen displayed on the connection destination device (MFP 10a) in the pairing of the "Numeric Comparison" mode. As illustrated in FIG. 7, the confirmation screen 210 displays the same authentication code as the authentication code ("135846") generated by the mobile terminal 50, and a message to request confirmation of the authentication code.

Figure 6:
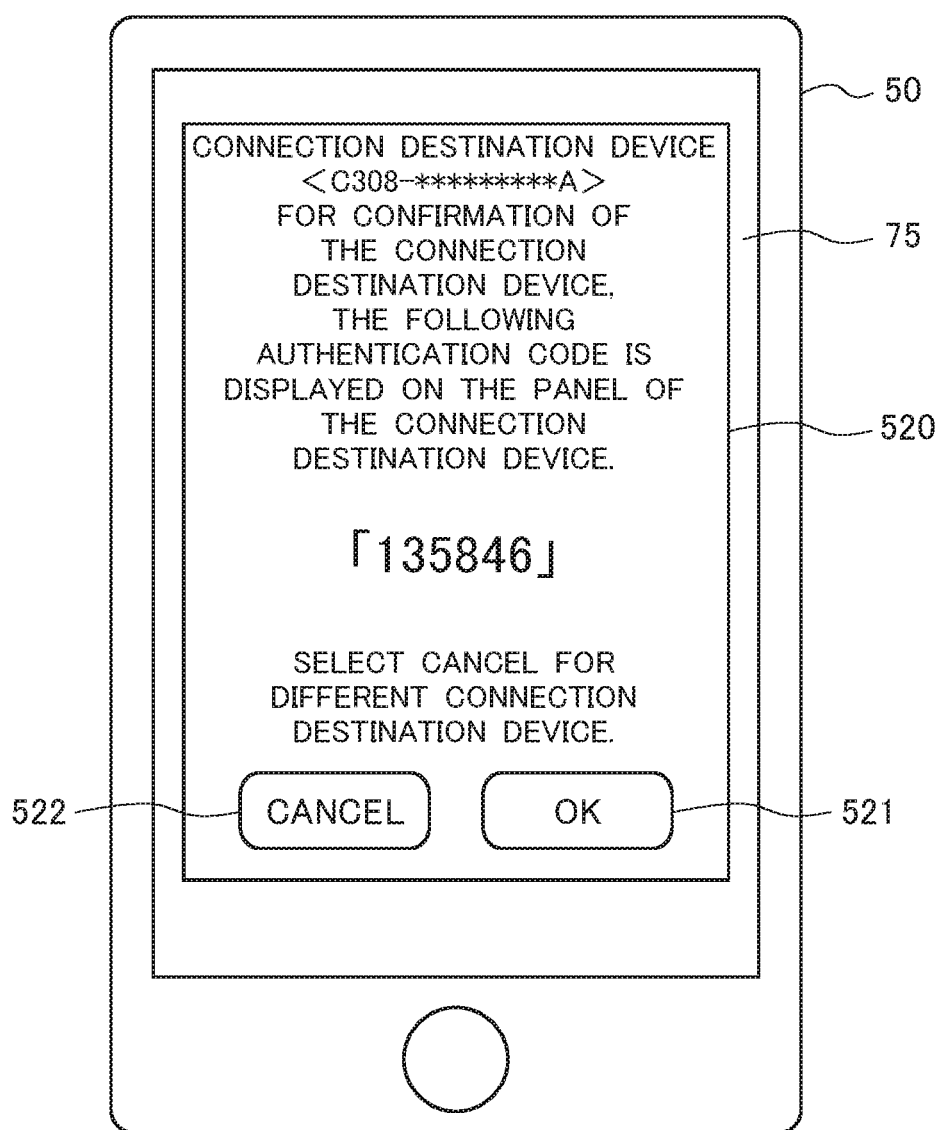
FIG. 6 illustrates a confirmation screen on the mobile terminal.

In step S20, the mobile terminal 50 (display control unit 63) displays a confirmation screen 520 that includes the authentication code ("135846") on the touch panel 75 (see FIG. 6).

The confirmation screen 520 is a screen displayed on the connection source device (mobile terminal 50) in the pairing of the "Numeric Comparison" mode. As illustrated in FIG. 6, the confirmation screen 520 displays not only the authentication code ("135846") generated by the mobile terminal 50 but also a message to notify that this authentication code is displayed on the touch panel 25 of the selected device (here, MFP 10a). The confirmation screen 520 also displays an "OK" button 521 for approving of the selected device as the desired connection destination device for Bluetooth communication, and a "CANCEL" button 522 for reselecting another connection candidate device as a connection destination device (see FIG. 6).

Then, in step S21, it is determined whether the selected device (here, MFP 10a) is the desired connection destination device for the user and whether connection to the selected device is permitted. More specifically, the user of the mobile terminal 50 determines whether the selected device (MFP 10a) is his or her desired connection destination device, on the basis of the authentication codes (here, "135846") displayed on both of the touch panel 75 of the mobile terminal 50 and the touch panel 25 of the MFP 10. The user then performs an operation of approving of the selected device as the desired connection destination device, as the operation of authenticating the connection destination device.

For example, when the selected device (MFP 10a) is determined as the desired connection destination device, the user of the mobile terminal 50 presses the "OK" button 521 (FIG. 6) and approves of the selected device as the desired connection destination device. When the "OK" button 521 is pressed (the user has performed the authentication operation), the selected device (MFP 10a) is determined as a connection destination device for Bluetooth communication, and connection to the selected device (MFP 10a) is permitted. This ends the authentication processing for authenticating the connection destination device in the "Numeric Comparison" mode, and the procedure proceeds from step S21 to step S22.

In step S22, the mobile terminal 50 (communication control unit 61) performs a pairing with the connection destination device (here, MFP 10a) and establishes connection to the connection destination device. When the connection between the mobile terminal 50 and the MFP 10a is established, a job such as a print job is transmitted from the mobile terminal 50 to the connection destination device (MFP 10a) and executed by the MFP 10a.

On the other hand, when it is determined that the selected device (MFP 10a) is not the desired connection destination device, the user of the mobile terminal 50 presses the "CANCEL" button 522 (FIG. 6) and reselects a connection destination device. To be more specific, when the "CANCEL" button 522 is pressed, connection to the selected device (MFP 10a) is not permitted, and the procedure returns from step S21 to step S17. Then, the device list screen 510 (FIG. 5) is displayed again on the touch panel 75 of the mobile terminal 50, and the user of the mobile terminal 50 reselects a desired connection destination device from among the multiple connection candidate devices.

As described above, in the operations according to the above-described embodiment, a suitable pairing mode is determined in accordance with the number of connection candidate devices detected for Bluetooth communication. It is thus possible in Bluetooth communication to properly establish connection to the desired connection destination device for a user while suppressing a reduction in usability for users More specifically, when a single connection candidate device is detected as a connection candidate device, a no-authentication required mode (here, "Just Works") that does not involve the operation of the user of the mobile terminal 50 authenticating the connection destination device is determined as a pairing mode. In other words, when only a single connection candidate device is detected as a connection candidate device, the mobile terminal 50 (automatically) determines the single connection candidate device as the desired connection destination device for a user, and determines a mode that does not involve the authentication operation as a pairing mode. Then, a pairing of the mobile terminal 50 and the connection destination device (single connection candidate device) is (automatically) performed without the user performing the operation of authenticating the connection destination device. Thus, when there is only a single connection candidate device, the user is not required to perform the operation of authenticating the connection destination device. This avoids the trouble of performing the authentication operation and suppresses a reduction in usability for users.

When multiple devices are detected as connection candidate devices, an authentication required mode (here, "Numeric Comparison") that involves the authentication operation is determined as a pairing mode. In other words, the user performs the operation of authenticating a connection destination device for Bluetooth communication when there are multiple connection candidate devices. This prevents a device other than the desired connection destination device for the user from being connected. In other words, it is possible to establish proper connection to the desired connection destination device for a user.

When a certain MFP 10 (e.g., MFP 10b) transmits unstable waves as described above, there is a problem that even if the MFP 10b is in close proximity to the mobile terminal 50 as illustrated in FIG. 11, the MFP 10b may not be detected as a connection candidate device when one MFP 10 is detected as a connection candidate device.

In view of this problem, in the above-described embodiment, a total number of MFPs 10 that are detected as connection candidate devices within a predetermined period of time from when one MFP 10 has been detected as a connection candidate device is determined as the number of connection candidate devices detected (step S12). Thus, even if a certain MFP 10 (MFP 10b) that is in close proximity to the mobile terminal 50 transmits unstable waves, the MFP 10b can also be detected as a connection candidate device if the intensity of the waves from the MFP 10b exceeds the threshold value TH at least once within the predetermined period of time. It is thus possible to detect all MFPs 10 that are in close proximity to the mobile terminal 50 as connection candidate devices without omission. To be more specific, it is possible to avoid a situation where, for example when two MFPs 10 are in close proximity to the mobile terminal 50, the mobile terminal 50 is automatically connected to one MFP 10 due to the other MFP 10 transmitting unstable waves.

In the above-described embodiment, the device list contains multiple connection candidate devices that are detected as connection candidate devices within a predetermined period of time from when one MFP 10 has been detected as a connection candidate device. That is, MFPs 10 whose intensity of the waves exceeds the threshold value TH at least once within the predetermined period of time are listed in the device list. This results in an increase in the number of choices of connection destination devices for Bluetooth communication.

5. Variations

While the above has been a description of embodiments of the present invention, the present invention is not limited to the examples described above.

For example, while the above-described embodiment takes the example of the form in which the "Numeric Comparison" mode is used as a pairing mode (authentication required mode) that involves the operation of a user authenticating the connection destination device, the present invention is not limited to this example, and the authentication required mode may be "Passkey Entry."

Figure 9:
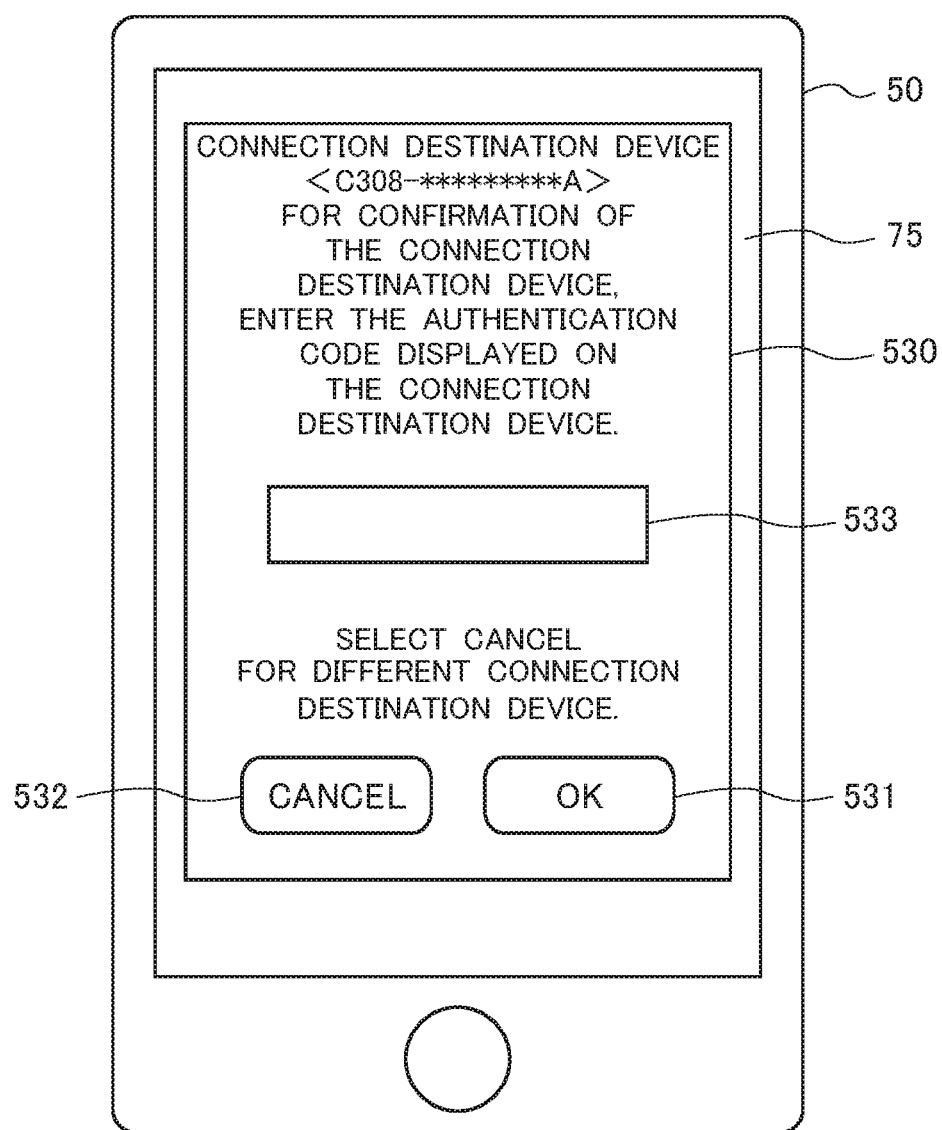
FIG. 9 illustrates a confirmation screen on a mobile terminal according to a variation.

More specifically, in processing for authenticating the connection destination device in the "Passkey Entry" mode, a confirmation screen 530 illustrated in FIG. 9 is displayed on the touch panel 75 of the connection source device (mobile terminal 50), and the user of the mobile terminal 50 is required to input an authentication code (passkey).

To be more specific, the mobile terminal 50 generates an authentication code (here, "135846") (step S18 (FIG. 4)) and transmits the authentication code to the selected device (e.g., MFP 10a) (step S19). The selected device (MFP 10a) displays the authentication code received from the mobile terminal 50 on the confirmation screen 210 (FIG. 7).

The mobile terminal 50 also displays, on the touch panel 75, the confirmation screen 530 (FIG. 9) for determining whether the selected device (here, MFP 10a) is the desired connection destination device for the user (step S20). As illustrated in FIG. 9, the confirmation screen 530 displays a message to request input of the authentication code displayed on the selected device (MFP 10a), and an entry field 533 for the authentication code.

The user of the mobile terminal 50 determines whether the selected device (MFP 10a) is his or her desired connection destination device and then inputs the same code (here, "135846") as the authentication code displayed on the confirmation screen 210 (FIG. 7) of the selected device to the entry field 533 displayed on the confirmation screen 530 (FIG. 9) of the mobile terminal 50. When the user has inputted the authentication code and this input code has been successfully verified against the authorized authentication code (authentication code displayed on the confirmation screen 210 in FIG. 7) (step S21), the mobile terminal 50 performs a pairing with the MFP 10a and establishes connection to the MFP 10a (step S22). In this way, the "Passkey Entry" mode may be used as the authentication required mode. Note that which of the modes, "Numeric Comparison" or "Passkey Entry," is used as the authentication required mode may be set in advance by, for example, an administrator.

While the above-described embodiment takes the example of the form in which the authentication code is generated by the connection source device (mobile terminal 50) (step S18), the present invention is not limited to this example, and the authentication code may be generated by, for example, a connection destination device (selected device).

While the above-described embodiment takes the example of the form in which the device IDs of multiple connection candidate devices are listed in the device list (see also FIG. 5), the present invention is not limited to this example. For example, device names that are set in advance for the multiple connection candidate devices may be listed in the device list.

More specifically, the device name of each MFP 10 (MFPs 10a to 10c) may be set in advance by, for example, an administrator (or a user).

For example, the administrator may set a device name (e.g., "West-Side MFP on 6th Floor) for the MFP 10a. The device name ("West-Side MFP on 6th Floor") set for the MFP 10a is included in the device identification information of the MFP 10a, described in the advertising data, and transmitted from the MFP 10a. Similarly, the administrator may respectively set device names (e.g., "Central MFP on 6th Floor" and "East-Side MFP on 6th Floor") for the MFPs 10b and 10c, and the advertising data that describes the device identification information including the device name is transmitted from each of the MFPs 10b and 10c. Note that the device name of each MFP 10 is preferably set such that the users of the multiple MFPs 10 (10a to 10c) in the image forming system 1 are able to identify each MFP 10.

Figure 10:
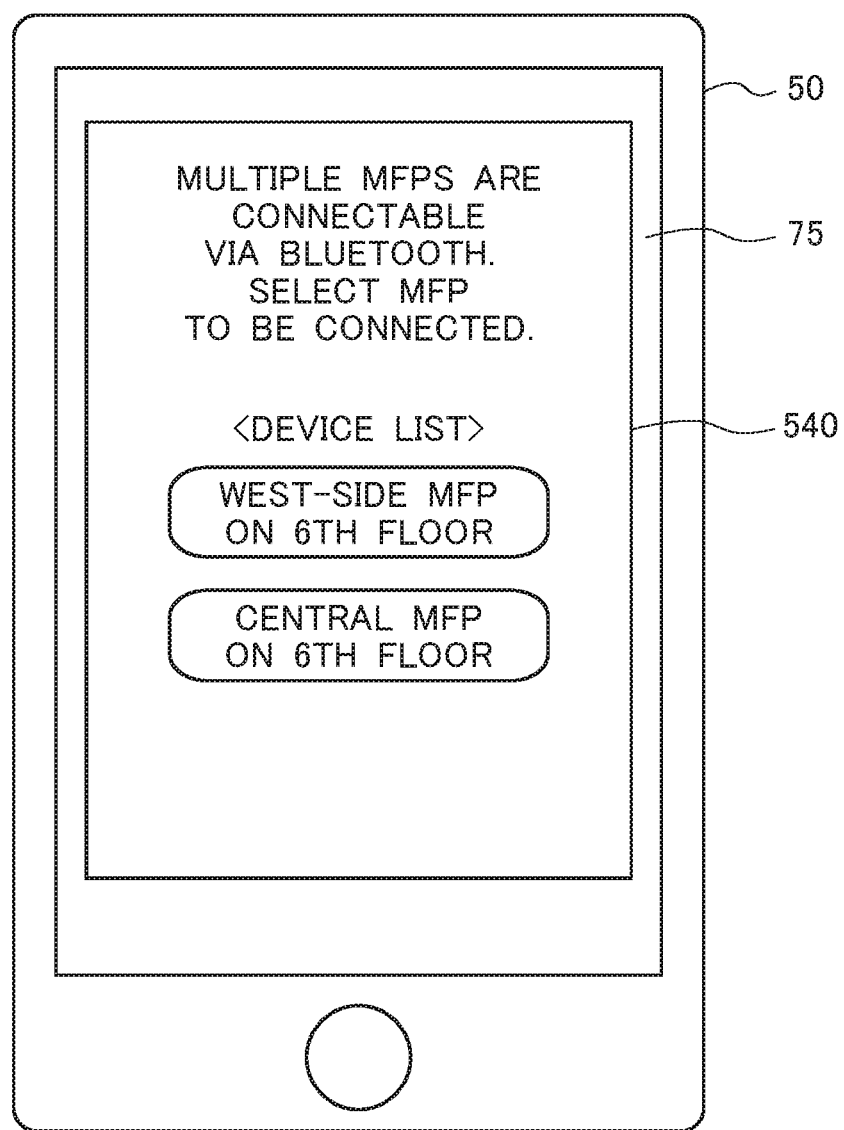
FIG. 10 illustrates a device list screen according to a variation.

Then, in the mobile terminal 50, when multiple devices (e.g., MFPs 10a and 10b) are detected as connection candidate devices, a device list screen 540 (see FIG. 10) is displayed on the touch panel 75. As illustrated in FIG. 10, the device list screen 540 displays the device names ("West-Side MFP on 6th Floor" and "Central MFP on 6th Floor") of the multiple connection candidate devices (MFPs 10a and 10b) in the device list.

In this way, the preset device names of the multiple connection candidate devices may be listed in the device list.

Here, there are cases where a relatively small number of users know the device IDs of the MFPs 10, and therefore it is difficult for a user who does not know the device IDs of the MFPs 10 to select a device ID that corresponds to his or her desired connection candidate device from among the multiple connection candidate devices listed in the device list.

On the other hand, in the form in which the preset device names of the multiple connection candidate devices are listed in the device list, users are easily able to select device names that correspond to their desired connection candidate devices from among the device names of the multiple connection candidate devices listed in the device list.

The above-described embodiment takes the example of the form in which when the authentication code is received from the mobile terminal 50 during execution of the processing for authenticating the connection destination device in the authentication required mode (steps S18 to S21), the confirmation screen 210 (FIG. 7) is (always) displayed on the touch panel 25 of the selected device (MFP 10*a*), irrespective of whether the MFP 10*a* is being used by other users. That is, the above-described embodiment takes the example of the form in which, when the authentication processing is performed, the confirmation screen 210 (FIG. 7) is (always) displayed on the touch panel 25 of the selected device, irrespective of whether the selected device is being logged in.

The present invention is, however, not limited to this example. For example, in the case where the selected device is not being logged in by any user when the authentication processing is performed, the confirmation screen 210 may be displayed, and in the case where when the selected device is being logged in by other users when the authentication processing is performed, an instruction receiving area (described later) may be displayed in a portion of the operation screen displayed on the touch panel 25.

More specifically, in the case where the selected device is not being logged in by any user (the selected device is in a non-logged-in state) when the authentication processing for authenticating the connection destination device is performed in the authentication required mode (steps S18 to S21), the selected device (display control unit 13) may directly display the confirmation screen 210 (FIG. 7) on the touch panel 25.

On the other hand, in the case where the selected device (here, MFP 10*a*) is being logged in by another user (e.g., user U2) other than the user (e.g., user U1) of the mobile terminal 50 when the authentication processing is performed, the instruction receiving area for receiving an instruction to display the confirmation screen 210 (FIG. 7) may be displayed in a portion of the operation screen displayed on the touch panel 25.

Figure 8:
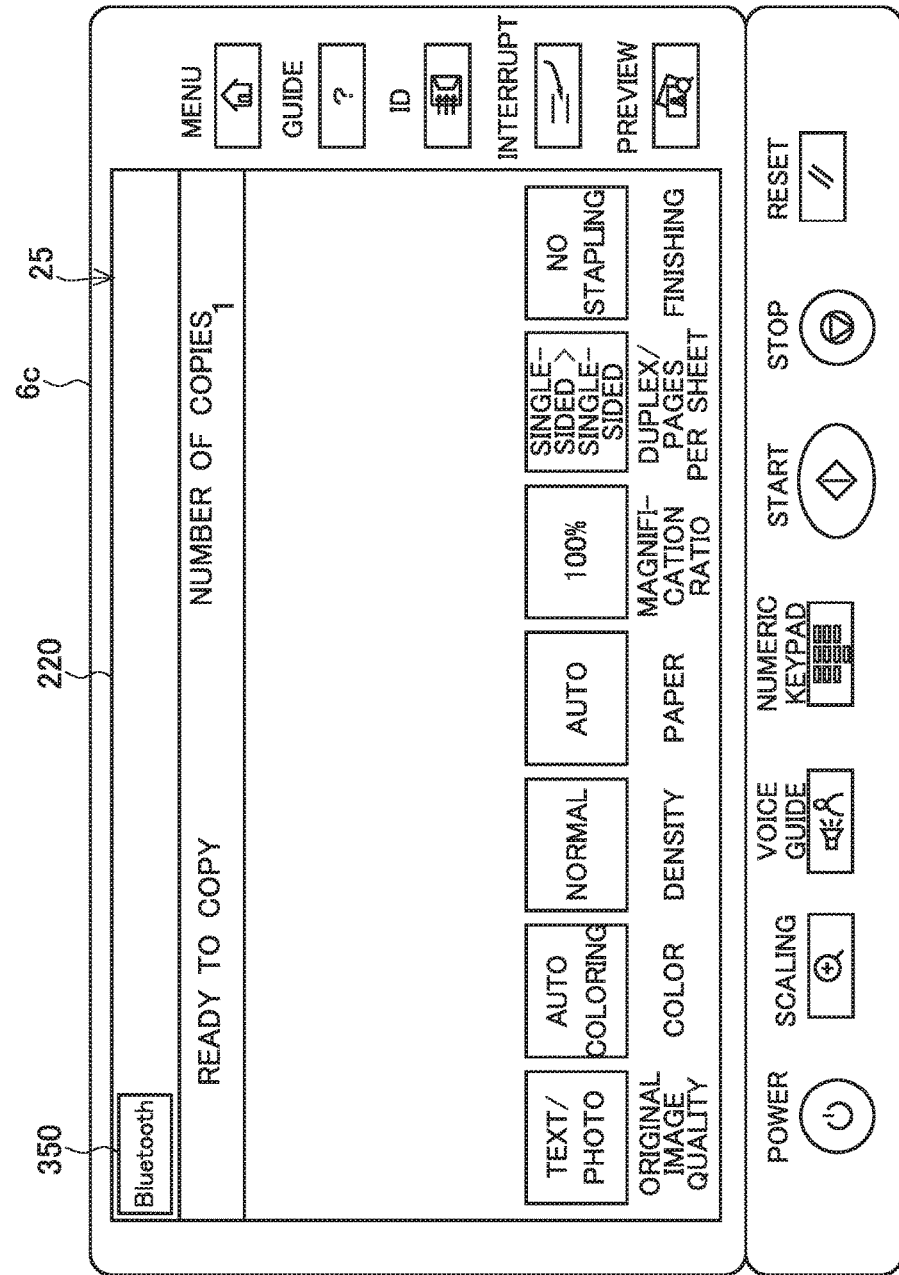
FIG. 8 illustrates an operation screen.

More specifically, when the selected device (MFP 10*a*) is currently being used (logged in) by the user U2, the MFP 10*a* displays the instruction receiving area (instruction receiving button 350) in a blank area of the operation screen 220 (here, upper-left area of the operation screen 220) where no display elements are arranged, as illustrated in FIG. 8. In short, the instruction receiving button 350 is displayed at a position that is out of the way of operations performed the logged-in user U2 of the selected device (MFP 10*a*).

The user (user U1) of the mobile terminal 50 (temporarily) operates the touch panel 25 of the MFP 10*a* upon receiving permission from the logged-in user U2 who is currently operating the touch panel 25 of the MFP 10*a*. When the instruction receiving button 350 displayed on the operation screen 220 is pressed by the user U1, the screen displayed on the touch panel 25 changes from the operation screen 220 (FIG. 8) to the confirmation screen 210 (FIG. 7). Then, when the "OK" button 521 in FIG. 6 is pressed by the user U1 (step S21), the pairing of the connection destination device (selected device) and the mobile terminal 50 is performed, and connection is established between the devices (step S22). When the authentication operation has ended, the operation screen 220 (FIG. 8) is displayed again on the touch panel 25 of the selected device (MFP 10*a*).

In this way, in the case where the selected device is being logged in by another user other than the user of the mobile terminal 50 (the selected device is in a logged-in state) when the authentication processing for authenticating the connection destination device is performed in the authentication required mode, the instruction receiving area may be displayed in a portion of the operation screen (to be more specific, an area of the operation screen where there are no display elements) displayed on the touch panel 25.

In this case, if higher priority is given to the user (user U1) of the mobile terminal 50 for use of the touch panel 25, the user U1 is able to perform the operation (authentication operation) of approving of the selected device as the desired connection destination device, even if the selected device is being used (logged in) by another user (user U2).

If higher priority is given to the logged-in user (user U2) for use of the touch panel 25, the logged-in user U2 is able to continue to perform his or her operation on the currently displayed operation screen (220). This avoids a situation where the logged-in user U2 becomes unable to use the touch panel 25 due to sudden display of the confirmation screen 210 (FIG. 7) on the touch panel 25.

While the above-described embodiment takes the example of the form in which the image forming system 1 includes the multiple MFPs 10 (here, MFPs 10*a*, 10*b*, and 10*c*) and the mobile terminal 50, the present invention is not limited to this example, and the image forming system may include a single MFP 10 (e.g., only MFP 10*a*) and the mobile terminal 50.

Even if the image forming system is constituted by a single MFP 10 and the mobile terminal 50, the number of connection candidate devices detected is determined (step S13), and a pairing mode of Bluetooth communication is determined in accordance with the number of devices detected.

Accordingly, even if the image forming system constituted by a single MFP 10 and the mobile terminal 50 is installed, it is not necessary to change program configurations of the MFP 10 and the mobile terminal 50 into, for example, configurations that use a fixed pairing mode. In addition, even if the number of MFPs 10 increases after installation of the image forming system, it is not necessary to change the program configurations from configurations that use a fixed pairing mode into configurations that selectively use different pairing modes. This avoids, for example, the cost and trouble involved in changing the program configurations.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming system comprising:
   at least one image forming apparatus configured to transmit a wave for short-distance wireless communication; and
   a mobile terminal capable of communication with the at least one image forming apparatus,
   wherein the mobile terminal includes:
   a detection unit configured to detect a connection candidate device on the basis of the wave, the connection candidate device being an image forming apparatus that is a connection destination candidate in short-distance wireless communication; and
   a determination unit configured to determine a pairing mode of the short-distance wireless communication in accordance with the number of connection candidate devices detected by the detection unit,
   the determination unit is configured to:
   in a case where a single connection candidate device is detected as the connection candidate device, determine a first mode as the pairing mode, the first mode being a mode that does not involve an authentication operation in which a user of the mobile terminal authenticates a connection destination device for the short-distance wireless communication, and in a case where a plurality of connection candidate devices are each detected as the connection candidate device, determine a second mode that involves the authentication operation as the pairing mode.

2. The image forming system according to claim 1, wherein
the determination unit is configured to determine that the number of connection candidate devices detected by the detection unit is a total number of image forming apparatuses that are each detected as the connection candidate device within a predetermined period of time from when one image forming apparatus has been detected as the connection candidate device.

3. The image forming system according to claim 1, wherein
the detection unit is configured to detect the connection candidate device on condition that the wave acquired by the mobile terminal has intensity higher than a predetermined threshold value.

4. The image forming system according to claim 1, wherein
the mobile terminal further includes:
a first display control unit configured to, in a case where the second mode is determined as the pairing mode, display a device list that contains the plurality of connection candidate devices; and
a communication control unit configured to tentatively determine a selected device that is selected from among the plurality of connection candidate devices contained in the device list as the connection destination device, and perform authentication processing for authenticating the connection destination device in the second mode.

5. The image forming system according to claim 4, wherein
the detection unit is configured to obtain a distance between the mobile terminal and each of the plurality of connection candidate devices on the basis of intensity of the wave received from each of the plurality of connection candidate devices, and
the first display control unit is configured to display the plurality of connection candidate devices in ascending order of the distance to the mobile terminal in the device list.

6. The image forming system according to claim 4, wherein
the first display control unit is configured to separately display device identification information of each of the plurality of connection candidate devices in the device list, and
the device identification information of each of the plurality of connection candidate devices includes a device name that is set in advance for each of the plurality of connection candidate devices.

7. The image forming system according to claim 4, wherein
the selected device includes:
a second display control unit configured to display various types of information on a display unit of the selected device, and
the second display control unit is configured to:
in a case where the selected device is in a non-logged-in state when the authentication processing is performed in the second mode, display a confirmation screen of the connection destination device in the second mode on the display unit, and
in a case where the selected device is in a logged-in state when the authentication processing is performed in the second mode, display an instruction receiving area in a portion of an operation screen displayed on the display unit, the instruction receiving area being an area for receiving an instruction to display the confirmation screen.

8. A non-transitory computer-readable recording medium that records a program for causing a computer that is built into a mobile terminal capable of communication with at least one image forming apparatus for transmitting a wave for short-distance wireless communication, to execute the steps of:
a) detecting a connection candidate device on the basis of the wave, the connection candidate device being an image forming apparatus that is a connection destination candidate in short-distance wireless communication; and
b) determining a pairing mode of the short-distance wireless communication in accordance with the number of connection candidate devices detected in the step a),
wherein in the step b),
in a case where a single connection candidate device is detected as the connection candidate device, a first mode that does not involve an authentication operation in which a user of the mobile terminal authenticates a connection destination device for the short-distance wireless communication is determined as the pairing mode, and
in a case where a plurality of connection candidate devices are each detected as the connection candidate device, a second mode that involves the authentication operation is determined as the pairing mode.

9. The non-transitory computer-readable recording medium according to claim 8, wherein
in the step a), it is determined that the number of connection candidate devices detected in the step a) is a total number of image forming apparatuses that are each detected as the connection candidate device within a predetermined period of time from when one image forming apparatus has been detected as the connection candidate device.

10. The non-transitory computer-readable recording medium according to claim 8, wherein
in the step a), the connection candidate device is detected on condition that the wave acquired by the mobile terminal has intensity higher than a predetermined threshold value.

11. The non-transitory computer-readable recording medium according to claim 8, wherein
the program further causes the computer to execute the steps of:
c) in a case where the second mode is determined as the pairing mode, displaying a device list that contains the plurality of connection candidate devices; and
d) tentatively determining a selected device that is selected from among the plurality of connection candidate devices contained in the device list as the connection destination device, and performing authentication processing for authenticating the connection destination device in the second mode.

12. The non-transitory computer-readable recording medium according to claim 11, wherein
the program further causes the computer to execute the step of:

e) prior to the step c), obtaining a distance between the mobile terminal and each of the plurality of connection candidate devices on the basis of intensity of the wave received from each of the plurality of connection candidate devices, and in the step c), the plurality of connection candidate devices are displayed in ascending order of the distance to the mobile terminal in the device list.

13. The non-transitory computer-readable recording medium according to claim 11, wherein in the step c), device identification information of each of the plurality of connection candidate devices is separately displayed in the device list, and, the device identification information of each of the plurality of connection candidate devices includes a device name that is set in advance for each of the plurality of connection candidate devices.

14. An image forming apparatus for transmitting a wave for short-distance wireless communication and being capable of communication with a mobile terminal, the apparatus comprising:

a receiving unit configured to receive a mode designation notification from the mobile terminal, the mode designation notification designating either a first mode or a second mode as a pairing mode of short-distance wireless communication, the first mode being a mode that does not involve an authentication operation in which a user of the mobile terminal authenticates a connection destination device for the short-distance wireless communication, and the second mode being a mode that involves the authentication operation; and a pairing unit configured to perform a pairing with the mobile terminal in the short-distance wireless communication, using the pairing mode designated by the mode designation notification.

15. The image forming apparatus according to claim 14, wherein the mode designation notification is a notification that designates, as the pairing mode, a mode that is determined by the mobile terminal in accordance with the number of connection candidate devices that are detected as connection destination candidates in the short-distance wireless communication on the basis of the wave, the first mode is a mode that is determined as the pairing mode in response to a single connection candidate device being detected as the connection candidate device, and the second mode is a mode that is determined as the pairing mode in response to a plurality of connection candidate devices being each detected as the connection candidate device.

16. The image forming apparatus according to claim 14, further comprising:

a display control unit configured to display various types of information on a display unit of the image forming apparatus, wherein the display control unit is configured to:

in a case where the image forming apparatus is in a non-logged-in state when authentication processing for authenticating the connection destination device is performed in the second mode, display a confirmation screen of the connection destination device in the second mode on the display unit, and in a case where the image forming apparatus is in a logged-in state when the authentication processing for authenticating the connection destination device is performed in the second mode, display an instruction receiving area in a portion of an operation screen displayed on the display unit, the instruction receiving area being an area for receiving an instruction to display the confirmation screen.

17. A mobile terminal capable of communication with at least one image forming apparatus for transmitting a wave for short-distance wireless communication, comprising:

a detection unit configured to detect a connection candidate device on the basis of the wave, the connection candidate device being an image forming apparatus that is a connection destination candidate in short-distance wireless communication; and a determination unit configured to determine a pairing mode of the short-distance wireless communication in accordance with the number of connection candidate devices detected by the detection unit, wherein the determination unit is configured to:

in a case where a single connection candidate device is detected as the connection candidate device, determine a first mode as the pairing mode, the first mode being a mode that does not involve an authentication operation in which a user of the mobile terminal authenticates a connection destination device for the short-distance wireless communication, and in a case where a plurality of connection candidate devices are each detected as the connection candidate device, determine a second mode that involves the authentication operation as the pairing mode.

18. A non-transitory computer-readable recording medium that records a program for causing a computer that is built into an image forming apparatus for transmitting a wave for short-distance wireless communication and being capable of communication with a mobile terminal, to execute the steps of:

a) receiving a mode designation notification from the mobile terminal, the mode designation notification designating either a first mode or a second mode as a pairing mode of short-distance wireless communication, the first mode being a mode that does not involve an authentication operation in which a user of the mobile terminal authenticates a connection destination device for the short-distance wireless communication, and the second mode being a mode that involves the authentication operation; and b) performing a pairing with the mobile terminal in the short-distance wireless communication, using the pairing mode designated by the mode designation notification.

* * * * *